(12) United States Patent
Han et al.

(10) Patent No.: US 10,983,878 B2
(45) Date of Patent: Apr. 20, 2021

(54) PROCESSOR FOR DETECTING AND PREVENTING RECOGNITION ERROR

(71) Applicant: ELECTRONICS AND TELECOMMUNICATIONS RESEARCH INSTITUTE, Daejeon (KR)

(72) Inventors: Jin Ho Han, Seoul (KR); Young-Su Kwon, Daejeon (KR); Min-Seok Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 16/694,913

(22) Filed: Nov. 25, 2019

(65) Prior Publication Data
US 2020/0167245 A1 May 28, 2020

(30) Foreign Application Priority Data

Nov. 27, 2018 (KR) .................... 10-2018-0148522
Feb. 21, 2019 (KR) .................... 10-2019-0020777

(51) Int. Cl.
*G06F 11/16* (2006.01)
*G06F 11/18* (2006.01)

(52) U.S. Cl.
CPC ........ *G06F 11/1641* (2013.01); *G06F 11/165* (2013.01); *G06F 11/1658* (2013.01);
(Continued)

(58) Field of Classification Search
CPC ............... G06F 11/1641; G06F 11/165; G06F 11/1658; G06F 11/1683; G06F 11/1687; G06F 11/181; G06F 11/184
See application file for complete search history.

(56) References Cited

U.S. PATENT DOCUMENTS 5,805,915 A * 9/1998 Wilkinson ............ G06F 9/3885
712/16
6,591,335 B1 7/2003 Sade et al.
(Continued)

FOREIGN PATENT DOCUMENTS

KR 20090125552 A 12/2009
KR 20180080876 A 7/2018

OTHER PUBLICATIONS

Kwon, Yongsu et al.,"Function-Safe Vehicular AI Processor with Nano Core-In-Memory Architecture", 2019, IEEE International Conference on Artificial Intelligence Circuits and Systems (AICAS), pp. 127-131 (Year: 2019).*

(Continued)

*Primary Examiner* — Matthew M Kim
*Assistant Examiner* — Indranil Chowdhury (57) ABSTRACT

Provided is an image recognition processor. The image recognition processor includes a plurality of nano cores each configured to perform a pattern recognition operation and arranged in rows and columns, an instruction memory configured to provide instructions to the plurality of nano cores in a row unit, a feature memory configured to provide input features to the plurality of nano cores in a row unit, a kernel memory configured to provide a kernel coefficient to the plurality of nano cores in a column unit, and a difference checker configured to receive a result of the pattern recognition operation of each of the plurality of nano cores, detect whether there is an error by referring to the received result, and provide a fault tolerance function that allows an error below a predefined level.

13 Claims, 7 Drawing Sheets

(52) U.S. Cl.
CPC ...... *G06F 11/1683* (2013.01); *G06F 11/1687* (2013.01); *G06F 11/181* (2013.01); *G06F 11/184* (2013.01)

(56) References Cited

U.S. PATENT DOCUMENTS

| | | | |
|---|---|---|---|
| 7,966,514 B2 | 6/2011 | Surasinghe | |
| 8,051,247 B1 | 11/2011 | Favor et al. | |
| 8,145,586 B2 | 3/2012 | Choi et al. | |
| 2018/0189643 A1 | 7/2018 | Kim et al. | |
| 2018/0357019 A1* | 12/2018 | Karr | G06F 3/061 |
| 2020/0175293 A1* | 6/2020 | Han | G06F 11/1645 |

OTHER PUBLICATIONS

Kim, Chan et al., "Implementation of Yolo-v2 Image Recognition and Other Testbenches for a CNN Accelerator", 2019, IEEE 9th International Conference on Consumer Electronics (ICCE-Berlin), pp. 242-247 (Year: 2019).*

Han, Jinho et al., "A Fault-Tolerant Cache System of Automotive Vision Processor Complying with ISO26262", Dec. 2016, IEEE Transactions on Circuits and Systems-II: Express Briefs, vol. 63, No. 12, pp. 1146-1150 (Year: 2016).*

Han, Jinho et al., "A 1GHz Fault Tolerant Processor with Dynamic Lockstep and Self-recovering Cache for ADAS SoC Complying with ISO26262 in Automotive Electronics", Nov. 6, 2017, IEEE Asian Solid-State Circuits Conference, pp. 313-316 (Year: 2017).*

Han, Jinho et al., "40-TFLOPS Artificial Intelligence Processor with Function-Safe Programmable Many-Cores for ISO26262 ASIL-D", Mar. 2020, ETRI Journal, Wiley, pp. 468-479 (Year: 2020).*

* cited by examiner

PROCESSOR FOR DETECTING AND PREVENTING RECOGNITION ERROR

CROSS-REFERENCE TO RELATED APPLICATIONS

This U.S. non-provisional patent application claims priority under 35 U.S.C. § 119 of Korean Patent Application Nos. 10-2018-0148522, filed on Nov. 27, 2018, and 10-2019-0020777, filed on Feb. 21, 2019, the entire contents of which are hereby incorporated by reference.

BACKGROUND

The present disclosure herein relates to an electronic device, and more particularly, to a processor that recognizes a pattern of an image provided from a sensor, and detects and prevents an error on the recognized pattern.

Recently, the development of a system requiring a high degree of intelligence and precision for Advanced Driver Assistance System (ADAS) or autonomous driving has been actively performed in automobiles and various transportation systems. Especially, in order to control vehicles by analyzing the recognition of the external environment and the signals from the recognized image, voice, or sensors, high system performance for analyzing and processing large amounts of data in real time is required. In these systems, since even minor recognition errors may cause large accidents, reliability of the processor system that performs the recognition of sensor data is particularly important.

In such a way, devices that process sensor data and recognize the pattern thereof should be designed to include fault tolerance to operate in harsh environments such as automobiles and airplanes. However, in pattern recognition systems such as deep neural network systems, a distributed computing technique that uses a large number of CPU cores is used. In such a system, a technique for detecting or recovering a recognition error still needs much research.

SUMMARY

The present disclosure provides a system and an error control method for detecting an error in operations of a system that processes sensor data and recognizes a pattern thereof, and recovers the error. In addition, the present disclosure provides a device for preventing a recognition rate error that may be accessed by software.

An embodiment of the inventive concept provides image recognition processor including: a plurality of nano cores each configured to perform a pattern recognition operation and arranged in rows and columns; an instruction memory configured to provide instructions to the plurality of nano cores in a row unit; a feature memory configured to provide input features to the plurality of nano cores in a row unit; a kernel memory configured to provide a kernel coefficient to the plurality of nano cores in a column unit; and a difference checker configured to receive a result of the pattern recognition operation of each of the plurality of nano cores, detect whether there is an error by referring to the received result, and provide a fault tolerance function that allows an error below a predefined level.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Hereinafter, it will be described in more detail with reference to the accompanying drawings so that those skilled in the art easily carry out the technical idea of the inventive concept.

Figure 1:
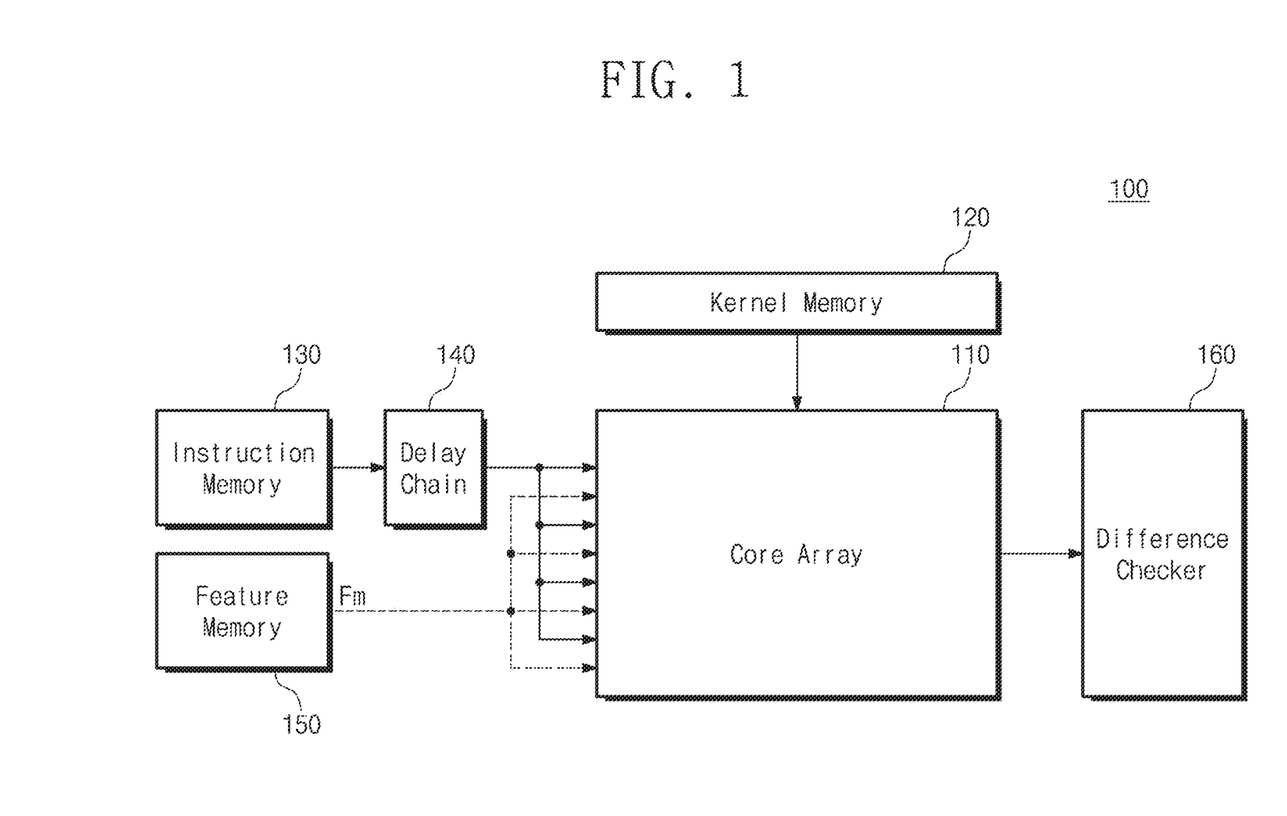
FIG. 1 is a block diagram schematically illustrating an image recognition processor according to an embodiment of the inventive concept.

FIG. 1 is a block diagram schematically illustrating a structure of an image recognition processor according to an embodiment of the inventive concept. Referring to FIG. 1, an image recognition processor 100 of the inventive concept includes a core array 110, a kernel memory 120, an instruction memory 130, a delay chain 140, a feature memory 150, and a difference checker 160.

The core array 110 processes input data Fm such as sensor data provided from the feature memory 150 using information on instructions and kernels provided from the instruction memory 130 and the kernel memory 120. For example, when the sensed image is received, the core array 110 performs a process for identifying a pattern of the image by using an instruction and a kernel. The core array 110 may perform a convolution operation or a pooling operation for down-sampling.

In particular, the core array 110 may include a plurality of Nano Cores (NCs) arranged in rows and columns for processing a plurality of convolution operations or pooling operations. The nano cores (NCs) may process the provided features in a parallel processing or a sequential processing. In the inventive concept, a plurality of NCs may be controlled to process the same operation with a specific delay time. Then, the result of the pattern recognition operation processed in the plurality of NCs at regular time intervals may be provided to the difference checker 160. The NC is not limited to the terms used in the description of the inventive concept. For example, it will be understood by those skilled in the art that the NC may also be referred to terms such as a Pressing Element (PE) or a Processing Unit (PU).

The kernel memory 120 provides a plurality of kernels to the core array 110 in synchronization with the instructions. The kernel memory 120 may provide kernel information or coefficients for convolution operations performed in the core array 110 and various parameters necessary for bias addition, activation, pooling, and the like.

The instruction memory 130 stores instructions to be performed by each of the plurality of NCs included in the core array 110. Then, in synchronization with the inputted features, the instruction memory 130 may transmit the stored instruction to the delay chain 140. Then, the delay chain delays one instruction by a specific delay unit and provides the delayed instruction to different NCs. Any one instruction provided from the instruction memory 130 may be sequentially provided to the plurality of NCs with a specific delay time. The unit in which the delayed instruction is provided may be a row or column unit of the NC.

The feature memory 150 stores an input image or data to be processed by the image recognition processor 100. The input image to be recognized is stored in the feature memory 150 and delivered to the core array 110. For example, image data may be stored in the feature memory 150. In addition, the feature memory 150 may store a feature map processed by a convolution operation. The feature map may be provided as input data for subsequent convolution operations.

The difference checker 160 may detect whether a recognition error occurs by receiving a result of an operation performed in the core array 110. For example, the difference checker 160 may compare the outputs of the plurality of NCs using the same input feature, the same instruction, and the same coefficient. The operations performed by these NCs may be executed at different time points. If it is detected that a difference exists by comparing the output of each of the NCs, the difference checker 160 may determine that a recognition error exists. However, if it is detected that the outputs of each of the NCs performing the same operation are identical, the difference checker 160 will determine that there is no recognition error. Furthermore, in a case where a recognition error is not large enough, even if a recognition error exists, the difference checker 160 may apply a fault tolerance function.

In the above, the structure of the image recognition processor 100 of the inventive concept has been briefly described. The difference checker 160 of the inventive concept compares the results of operations performed by a plurality of NCs to detect a recognition error. In addition, if a fault tolerance function is applied by applying a predetermined margin according to the detected degree of recognition error, the reliability of the image recognition processor 100 of the inventive concept may be improved.

Figure 2:
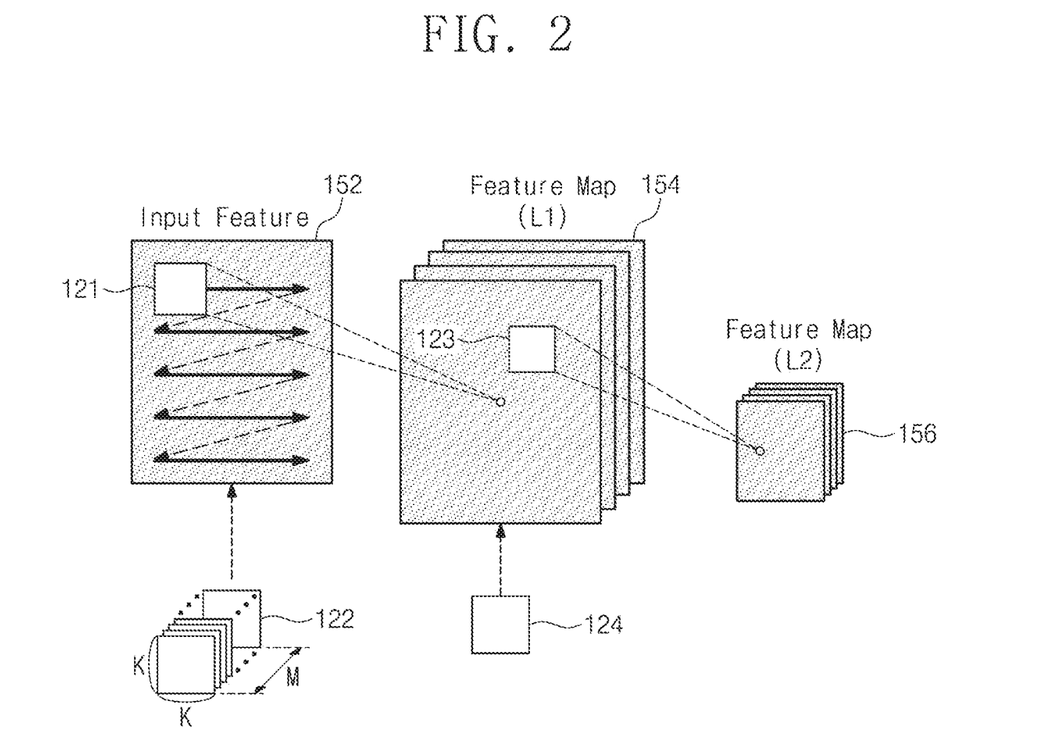
FIG. 2 is a view briefly illustrating an image recognition process performed in a core array of the inventive concept.

FIG. 2 is a diagram briefly showing an example of a convolution operation performed by NCs according to an embodiment of the inventive concept. Referring to FIG. 2, the input feature 152 may be generated as a feature map 154 by a convolution operation, and the feature map 154 may be outputted as another feature map 156 by a pulling operation.

The input feature 152 is converted into the feature map 154 in an array form by convolution operations with the kernel 121. When adding the values of the elements generated through the convolution processing of the position overlapping the input feature 152 and the kernel 121, a feature value corresponding to one point in the feature map 154 is generated. When performing a convolution operation while shifting the kernel 121 with respect to the positions of all the input features 152, one feature array may be generated. If such a convolution operation is performed using a plurality of kernels 122 (e.g., M kernels), all feature maps 154 (e.g., M feature maps) may be generated.

Here, the input feature 152 processed through the convolution operation may be substantially divided into various components. For example, one input feature 152 may be divided into image data representing color and contrast for each of the RGB components. In addition, the input feature 152 may be divided into data having a variable size. A processing unit that performs a convolution operation using all the kernels 152 (e.g., M kernels) of these various image data will be hereinafter referred to as a convolution loop. These convolution loops will be executed by a plurality of depths of the input feature 152.

In addition, a convolution operation using another kernel 124 for the feature map 154 may be followed. The feature map 156 may be generated through this convolution operation on any one input feature 152.

NCs included in the core array 110 of the inventive concept may process the above operations in a parallel processing manner. Alternatively, the NCs may be driven in a manner of processing one input image in parallel by applying different kernels. Alternatively, the NCs may be divided in group units, and each group may process operations for different input features (e.g., frames). In each case, the difference checker 160 may compare operation results, detect the presence of a recognition error, or perform a fault tolerance function that allows an error within a predetermined margin.

Figure 3:
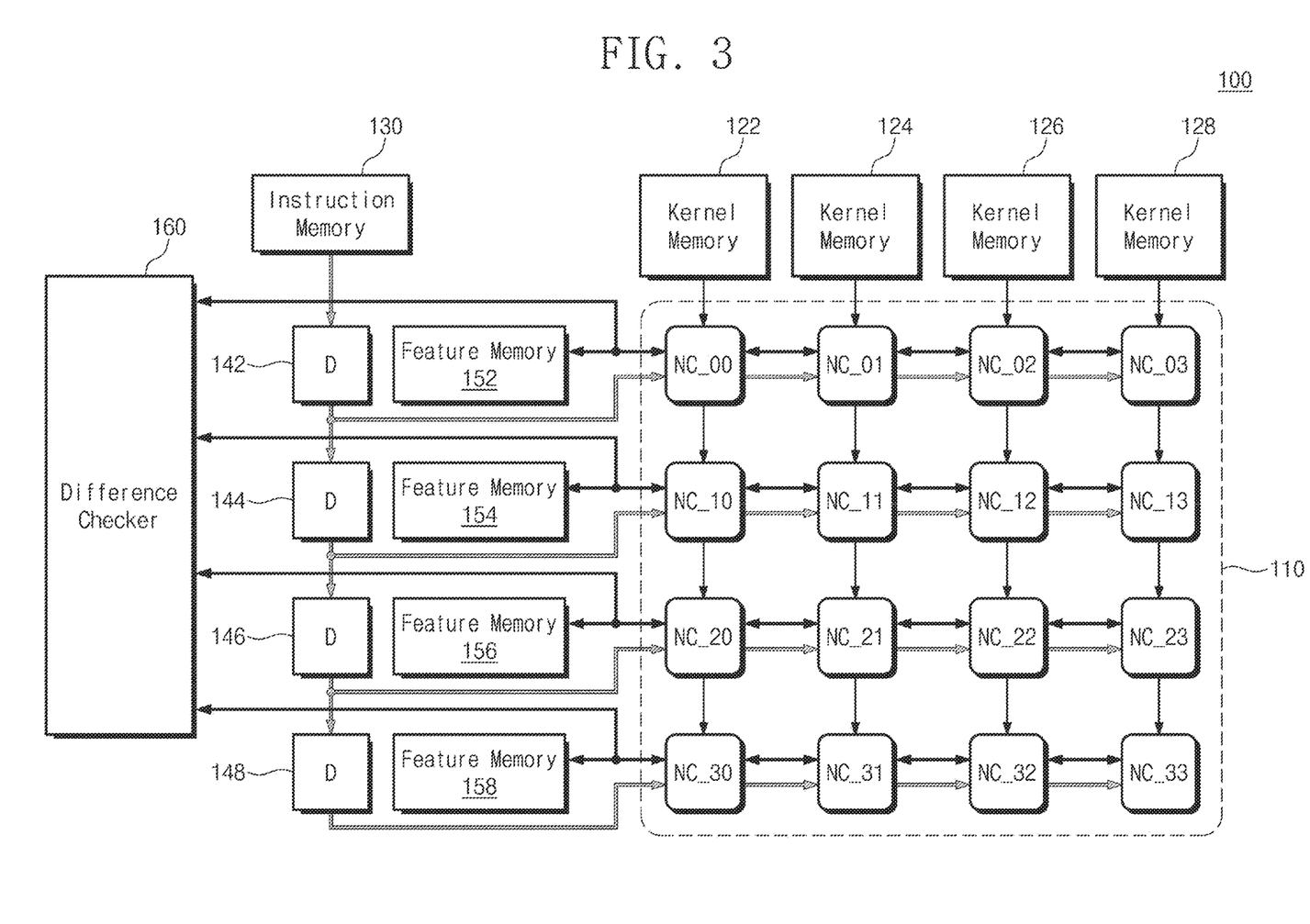
FIG. 3 is a block diagram illustrating a structure of an image recognition processor in detail according to an embodiment of the inventive concept.

FIG. 3 is a block diagram showing in detail the configuration of an image recognition processor of the inventive concept. Referring to FIG. 3, each of the core array 110, the kernel memory 120, the delay chain 140, and the feature memory 150 includes a plurality of sub-elements.

The core array 110 may include a plurality of NCs NC_xy (0≤x, y≤3) arranged in rows and columns by way of example. The NCs NC_xy may each perform a convolution operation for pattern recognition using input instructions, data, and kernel coefficients. The NCs NC_xy may perform processing on the provided input features in a parallel processing method or a sequential processing method.

One NC NC_xy may be provided from the instruction memory 130 or may receive instructions from an NC NC_x(y−1) adjacent in the left direction. Then, the NC NC_xy may receive an input feature from any one of the feature memories 152, 154, 156, and 158 or from an adjacent NC NC_x(y−1) in the left direction. In addition, the NC NC_xy may receive a kernel coefficient for operation from any one of the kernel memories 122, 124, 126, and 128 or from an adjacent NC (NC_(x−1)y) in an upward direction.

In addition, the NC NC_xy may perform an operation corresponding to the provided instruction using the received input feature and the kernel coefficients. While simultaneously performing the operation according to the instruction, the NC NC_xy transmits the input feature to the NC on the right NC_x(y+1), and transmits the kernel coefficient received from the upper side to the NC(NC_(x+1) y adjacent to the lower side.

In addition, the NC NC_xy transmits the performance result of the operation to either the adjacent NC NC_x(y−1) in the left direction or the feature memories 152, 154, 156, and 158. For example, the NC NC_01 transmits the results of operations using input features and coefficients to the NC NC_00 in the same row. In addition, the NC NC_01 may receive the operation result of the NC NC_02 and transmit the operation result to the NC NC_00. In this manner, the NC NC_00 transmits its operation performance result and the operation result of the NCs NC_01, NC_02, and NC_03 included in the same row to the feature memory 152 or the difference checker 160.

According to the above-described scheme, the plurality of NCs NC_xy included in one row may perform a convolution operation on one input feature using different kernel coefficients. That is, the plurality of NCs NC_xy may perform a convolution operation on one input feature using a plurality of different kernels. Then, each operation result may be compared or evaluated by any one of the feature memories 152, 154, 156, 158 or by the difference checker 160. Alternatively, it will be understood well that the plurality of NCs NC_xy may process a plurality of different input features using a plurality of different kernel coefficients.

In the manner described above, in response to an instruction from the delay circuit 144, the NCs NC_0y (0≤y≤3) process the input features provided from the feature memory 154 using the kernel coefficients provided through the upper NC_0y (0≤y≤3). That is, the NCs NC_1y (0≤y≤3) perform a convolution operation on the input feature provided from the feature memory 154 and transmit the input feature to the feature memory 154 or the difference checker 160.

The NCs NC_2y (0≤y≤3), which constitute one row in the core array 110, transmits the operation result to the feature memory 156 or the difference checker 160. In the same manner, the NCs NC_3y (0≤y≤3) will perform a convolution operation using the input feature and kernel coefficients from the feature memory 158 and transmit the result to the feature memory 158 or the difference checker 160.

Input features provided by each of the feature memories 152, 154, 156, and 158 may be provided identically or differently. The same input feature may be transmitted to each row of NCs included in the core array 110 through the configuration of the input feature provided in the feature memories 152, 154, 156, and 158. Alternatively, when each of the feature memories 152, 154, 156, and 158 provides different input features, the NCs of the core array 110 may perform different pattern recognition in row units.

The difference checker 160 may determine whether a recognition error exists by comparing operation results of each of the plurality of NCs NC_xy included in one row. Alternatively, the difference checker 160 may determine a recognition error by comparing operation results of a plurality of NCs NC_xy by each row unit. In addition, when the plurality of NCs NC_xy are set to process input features corresponding to one frame, the processing results of the plurality of NCs NC_xy may be accumulated. Then, a difference between the recognition results in the previous frame and the current frame may be detected using the accumulated processing result.

Figure 4:
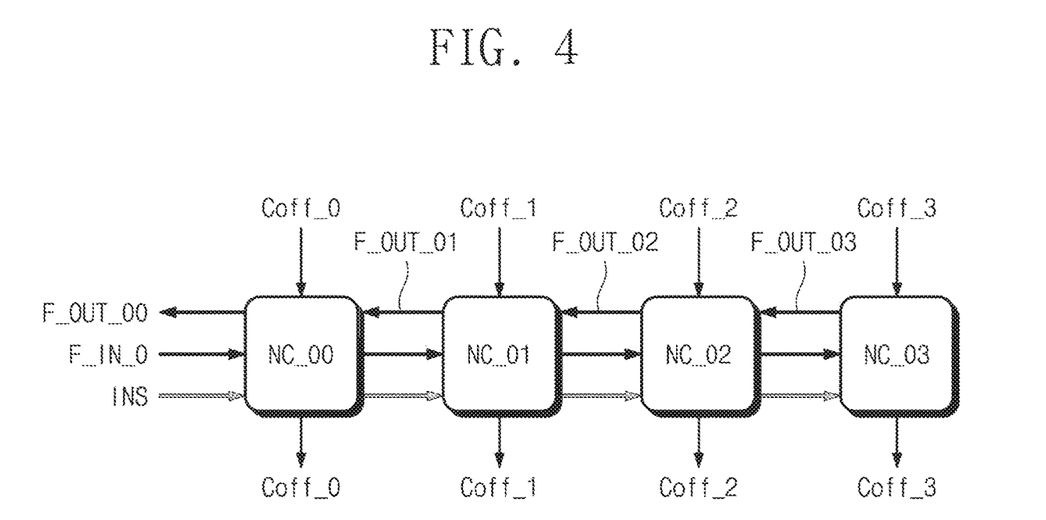
FIG. 4 is a diagram briefly showing data transmission in nano cores of the inventive concept.

FIG. 4 is a view briefly showing the operation of NCs in a row unit according to an embodiment of the inventive concept. Referring to FIG. 4, detailed operations of the NCs NC_0y (0≤y≤3) provided with input features from the feature memory 152 will be briefly described.

The NC NC_00 will receive the instruction INS outputted from delay circuit 142. Then, the NC NC_00 receives the input feature F_IN_0 from the feature memory 152 with the reception of the instruction INS, and receives the kernel coefficient Coff_0 from the kernel memory 122. The NC NC_00 performs an operation using the input feature F_IN_0 and the kernel coefficient Coff_0 in response to the instruction INS. For example, the NC NC_00 may perform a convolution operation on the input feature F_IN_0 by using a kernel corresponding to the kernel coefficient Coff_0. At the same time, NC NC_00 will transmit the kernel coefficient Coff_0 transmitted from kernel memory 122 to the NC NC_10 located in the same column. In addition, the NC NC_00 will transmit the input feature F_IN_0 transmitted from the feature memory 152 to the adjacent NC NC_01 in the row direction.

The NC NC_01 receives the input feature F_IN_0 and the instruction INS transmitted through the NC NC_00. Then, the NC NC_01 receives the kernel coefficient Coff_1 from the kernel memory 124. The NC NC_01 may perform a convolution operation using the input feature F_IN_0 and the kernel coefficient Coff_1 in response to the instruction INS. In addition, the NC NC_01 will transmit the kernel coefficient Coff_1 transmitted from the kernel memory 124 to the NC NC_11 located in the same column. In addition, the NC NC_01 transmits the input feature F_IN_0 and the instruction INS transmitted through the NC NC_00 to the adjacent NC NC_02 in the row direction.

The NC NC_02 receives an input feature F_IN_0 and an instruction INS transmitted through the NC NC_01. The NC NC_02 receives the kernel coefficient Coff_2 from the kernel memory 126. The NC NC_02 may perform a convolution operation using the input feature F_IN_0 and the kernel coefficient Coff_2 in response to the instruction INS. In addition, the NC NC_02 will transmit the kernel coefficient Coff_2 transmitted from the kernel memory 126 to the NC NC_12 located in the same column. In addition, the NC NC_02 transmits the input feature F_IN_0 and the instruction INS transmitted through the NC NC_01 to the adjacent NC NC_03 in the row direction.

The NC NC_03 receives the input feature F_IN_0 and the instruction INS transmitted through the NC NC_02. The NC NC_03 receives the kernel coefficient Coff_3 from the kernel memory 128. The NC NC_03 may perform a convolution operation using the input feature F_IN_0 and the kernel coefficient Coff_3 in response to the instruction INS. In addition, the NC NC_03 will transmit the kernel coefficient Coff_3 transmitted from the kernel memory 128 to the NC NC_13 (see FIG. 3) located in the same column. Since the NC NC_03 is the last right core of the row, the transmission operation of the instruction INS or the input feature F_IN_0 may not be performed.

On the other hand, the NC NC_03 will transmit the operation result F_OUT_03 to the NC NC_02 on the left side. The NC NC_02 transmits its calculation result F_OUT_02 and the calculation result F_OUT_03 provided from the right NC NC_03 to the left NC NC_01. The NC NC_01 transmits its operation result F_OUT_01 and the operation results F_OUT_02 and F_OUT_03 provided from the right NCs NC_02 and NC_03 to the left NC NC_00. Eventually, the NC NC_00 will transmit its operation result F_OUT_00 and operation results F_OUT_01, F_OUT_02, F_OUT_03 provided from the right NCs NC_01, NC_02, NC_03 to the feature memory 152 or the difference checker 160.

In the above, the input/output relations of the instructions, input features, kernel coefficients, and operation results of the plurality of NCs NC_00, NC_01, NC_02, NC_03 that receive the input feature F_IN_0 from the feature memory 152 have been briefly described. Like the NCs NC_00, NC_01, NC_02 and NC_03 constituting the first row of the core array 110, the NCs NC_10, NC_11, NC_12 and NC_13 may be driven in the same manner except that only the input features are different. It may be regarded that the NCs NC_20, NC_21, NC_22, and NC_23 and the NCs NC_30, NC_31, NC_32, and NC_33 that constitute one row also differ only in the feature memory provided with the input feature but operate in the same manner as the NCs NC_00, NC_01, NC_02, and NC_03. Of course, it will be understood that the timing of instruction transmission by the delay circuits 142, 144, 146, and 148 or the timing of the transmission of instructions, input features, and kernel coefficients occurring in the respective cores may be different.

Figure 5:
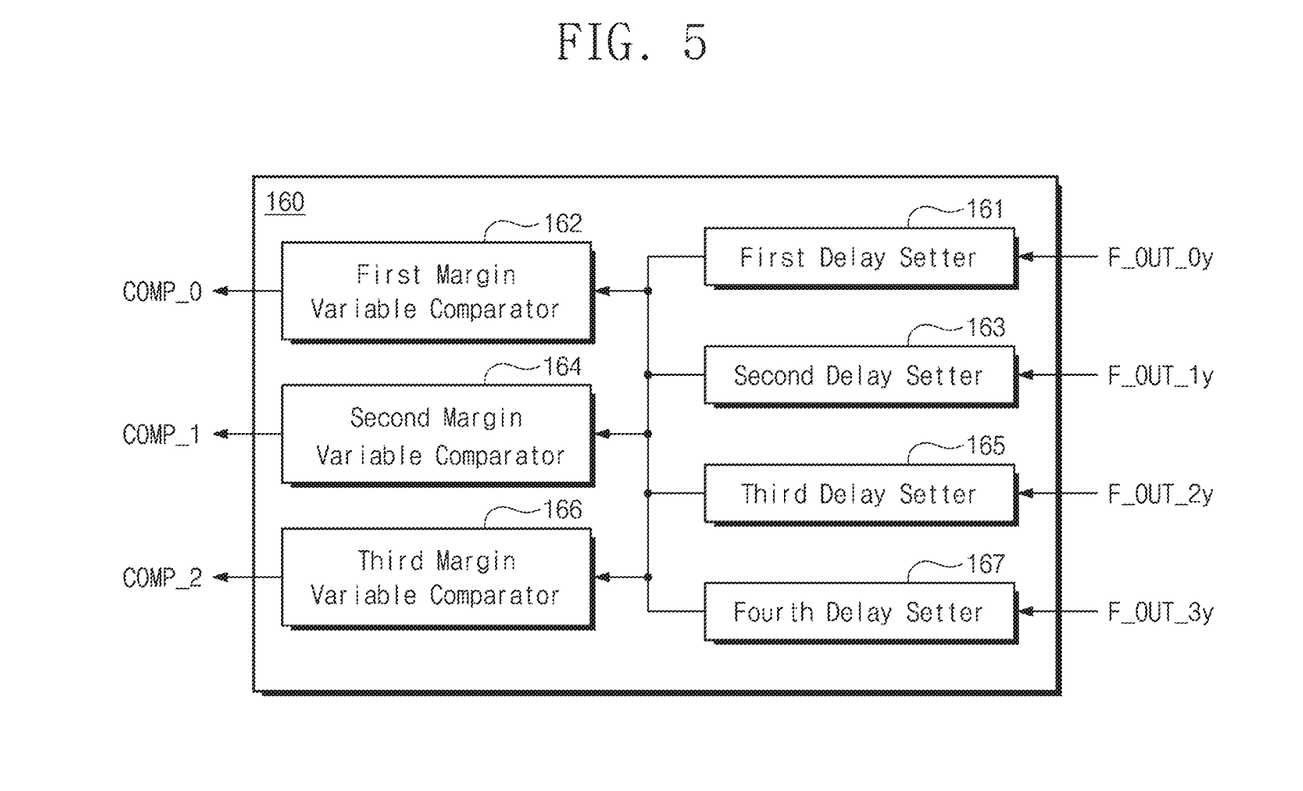
FIG. 5 is a block diagram exemplarily illustrating a configuration of the difference checker of FIG. 3.

FIG. 5 is a block diagram illustrating an exemplary configuration of the difference checker shown in FIG. 3. Referring to FIG. 5, the difference checker 160 may include a plurality of delay setters 161, 163, 165, and 167 and a plurality of margin variable comparators 162, 164, and 166.

The plurality of delay setters 161, 163, 165, and 167 may control the delay of the operation result F_OUT_xy transmitted from the plurality of NCs NC_xy. For example, the first delay setter 161 may set a delay of the operation results F_OUT_0y provided from the plurality of NCs NC_00, NC_01, NC_02, and NC_03. The operation results F_OUT_0y of the plurality of NCs NC_00, NC_01, NC_02, and NC_03 are provided to the first delay setter 161 through the NC NC_00. Accordingly, the operation results F_OUT_00, F_OUT_01, F_OUT_02, and F_OUT_03 may be sequentially inputted to the first delay setter 161 with a constant delay. The temporal arrangement may be synchronized for comparison of the operation results F_OUT_00, F_OUT_01, F_OUT_02, and F_OUT_03. The first delay setter 161 may synchronize the calculation results F_OUT_00, F_OUT_01, F_OUT_02, and F_OUT_03 to transmit them to at least one of the plurality of margin variable comparators 162, 164, and 166.

The second to fourth delay setters 163, 165, and 167 may align the operation results of corresponding NCs in the same manner as the first delay setter 161. Then, each aligned operation result may be transmitted to at least one of the plurality of margin variable comparators 162, 164, and 166.

The plurality of margin variable comparators 162, 164, and 166 compare operation results provided from the NCs to generate comparison values COMP_0, COMP_1, and COMP_2 that determine recognition errors. For example, the first margin variable comparator 162 may compare the calculation results F_OUT_00, F_OUT_01, F_OUT_02, and F_OUT_03 by applying a preset margin. The operation results F_OUT_00, F_OUT_01, F_OUT_02 and F_OUT_03 are values transmitted from the plurality of NCs NC_00, NC_01, NC_02 and NC_03. If there is a difference below a set value between the operation results F_OUT_00, F_OUT_01, F_OUT_02, and F_OUT_03, the first margin variable comparator 162 may determine that the processing is normally performed. That is, the first margin variable comparator 162 may perform a fault tolerance function that allows an error smaller than a reference value.

Alternatively, the second margin variable comparator 164 may compare the operation results of NCs corresponding to different rows to determine whether an error exists. For example, the second margin variable comparator 164 may compare the operations results F_OUT_00, F_OUT_01, F_OUT_02, and F_OUT_03 transmitted from the first delay setter 161 and the operation results F_OUT_10, F_OUT_11, F_OUT_12, and F_OUT_13 transmitted from the second delay setter 163. That is, the second margin variable comparator 164 may compare the operation results corresponding to the same column by applying a predefined margin.

The third margin variable comparator 164 may compare the operation result in group units by applying a predefined margin. The third margin variable comparator 164 may compare operation results of different frame units. The plurality of margin variable comparators 162, 164, and 166 may be provided in correspondence to the maximum case of the comparison scheme. Here, it will be understood well that the number of the plurality of margin variable comparators 162, 164, and 166 may be added or reduced in various ways depending on the size of the margin to be set.

Figure 6A:
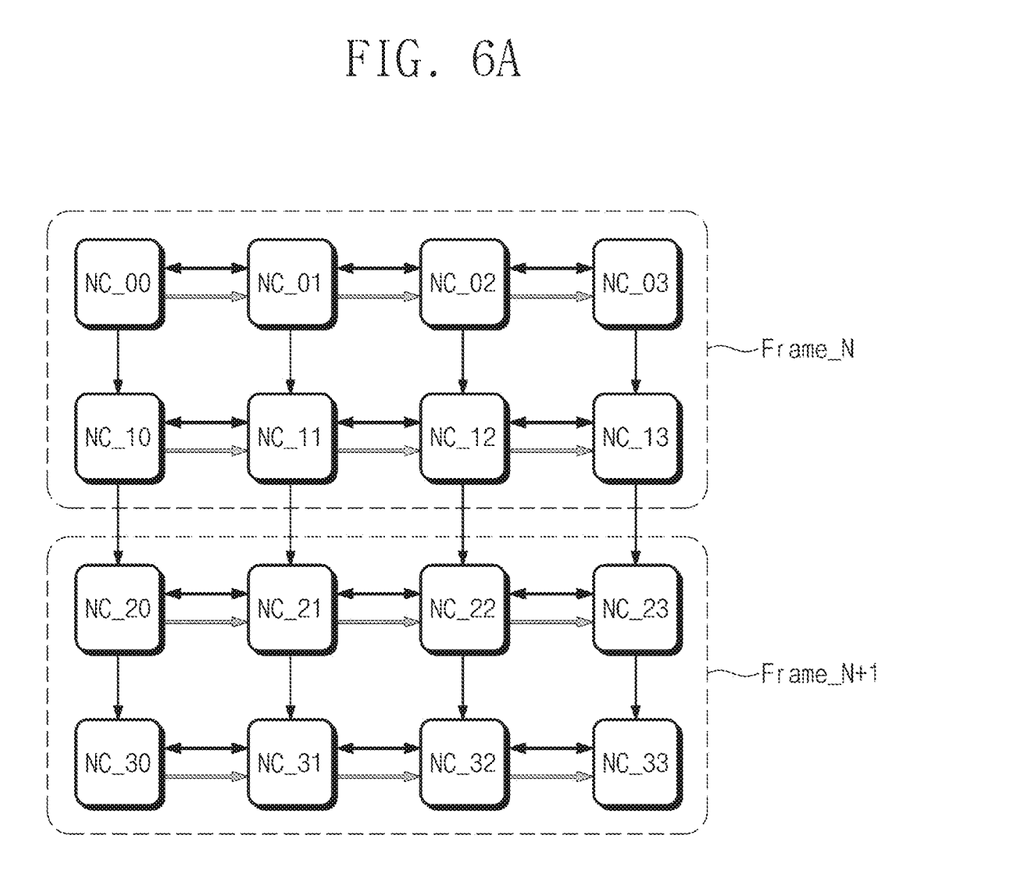
FIGS. 6A and 6B are block diagrams showing usage examples of a difference checker.
Figure 6B:
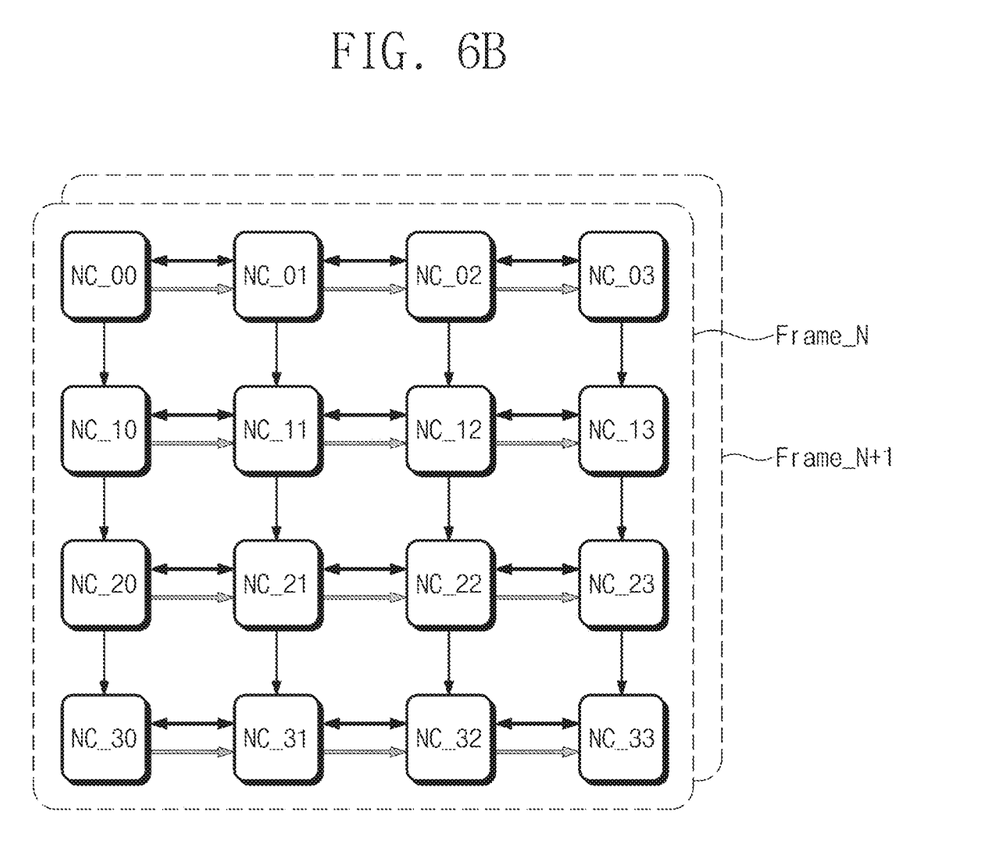

FIGS. 6A and 6B are exemplary views illustrating an operation unit of NCs according to a method of using a difference checker. FIG. 6A shows a case where NCs are divided into a plurality of groups to process different frames. Then, FIG. 6B illustrates a case where NCs receive and process features of one frame unit, but process frames divided in time series.

Referring to FIG. 6A, NCs NC_00, NC_01, NC_02, NC_03, NC_10, NC_11, NC_12, and NC_13 located in the first and second rows may be classified into a first group. The NCs NC_20, NC_21, NC_22, NC_23, NC_30, NC_31, NC_32, and NC_33 located in the third and fourth rows may be classified into a second group. The pattern recognition operation for the first frame Frame_N will be allocated to the NCs of the first group. Then, a pattern recognition operation for the second frame Frame_N+1 may be allocated to the NCs of the second group.

The difference checker 160 may compare the operation results F_OUT_0y and F_OUT_1y ($0 \leq y \leq 3$) outputted by the NCs of the first group and the operation result F_OUT_2y and F_OUT_3y ($0 \leq y \leq 3$) outputted by the NCs of the second group. Using the comparison result, the difference checker 160 may identify a difference between the pattern recognition results in the two frames Frame_N and Frame_N+1.

Referring to FIG. 6B, all of the NCs NC_xy positioned in the first to fourth rows may be set to perform a pattern recognition operation for one frame. That is, all cores NC_xy included in the core array 110 may be set to process input features of one frame unit. In this case, the pattern recognition operation on the first frame Frame_N and the pattern recognition operation on the second frame Frame_N+1 may be performed at different times.

The difference checker 160 may compare operation results F_OUT_xy ($0 \leq x, y \leq 3$) outputted by each of the NCs in a frame unit. Using the comparison result, the difference checker 160 may identify a difference between the pattern recognition results in the two frames Frame_N and Frame_N+1.

According to the inventive concept, the possibility of error detection and recovery of a sensor device and a recognition device processing sensor data may be further improved by the system of the inventive concept. Through this function, a malfunction due to the recognition rate limit of the pattern recognition system may be prevented.

Although the exemplary embodiments of the inventive concept have been described, it is understood that the inventive concept should not be limited to these exemplary embodiments but various changes and modifications may be made by one ordinary skilled in the art within the spirit and scope of the inventive concept as hereinafter claimed.

What is claimed is:

1. An image recognition processor comprising:
   a plurality of nano cores each configured to perform a pattern recognition operation and arranged in rows and columns;
   an instruction memory configured to provide instructions to the plurality of nano cores in a row unit;
   a feature memory configured to provide input features to the plurality of nano cores in a row unit;
   a kernel memory configured to provide a kernel coefficient to the plurality of nano cores in a column unit; and
   a difference checker configured to receive a result of the pattern recognition operation of each of the plurality of nano cores, detect whether there is an error by referring to the received result, and provide a fault tolerance function that allows an error below a predefined level.

2. The image recognition processor of claim 1, wherein the plurality of nano cores comprise:
   a first nano core configured to process a first input feature provided from the feature memory in response to a first instruction provided from the instruction memory using a first kernel coefficient provided from the kernel memory; and
   a second nano core positioned in the same row as the first nano core and configured to process the first instruction and the first input feature transmitted by the first nano core using a second kernel coefficient provided from the kernel memory.

3. The image recognition processor of claim 2, wherein the plurality of nano cores comprise a third nano core configured to process the first instruction and the first input feature transmitted by the second nano core using a third kernel coefficient provided from the kernel memory,
wherein the third nano core transmits an operation result to the second nano core.

4. The image recognition processor of claim 3, wherein the second nano core transmits an operation result to the first nano core,
wherein the first nano core transmits an operation result of each of the first to third nano cores to the feature memory or the difference checker.

5. The image recognition processor of claim 2, wherein the plurality of nano cores comprise:
a first kernel coefficient positioned in the same column as and a different column than the first nano core using a first kernel coefficient transmitted by the first nano core, a second instruction provided by the instruction memory, and a second input feature provided by the feature memory; and
a fifth nano core positioned in the same row as the fourth nano core and configured to process the second instruction and the second input feature transmitted by the fourth nano core using a second kernel coefficient transmitted by the second nano core.

6. The image recognition processor of claim 1, wherein the difference checker compares a first operation result provided from a first group of nano cores among the plurality of nano cores with a second operation result provided from a second group of nano cores among the plurality of nano cores.

7. The image recognition processor of claim 6, wherein each of the first group and the second group processes the same image data.

8. The image recognition processor of claim 7, wherein the difference checker compares the first operation result with the second operation result to determine whether there is a recognition error.

9. The image recognition processor of claim 8, wherein the difference checker determines that normal image recognition is performed when a difference between the first operation result and the second operation result is less than or equal to a preset margin.

10. The image recognition processor of claim 6, wherein each of the first group and the second group processes consecutive frame data.

11. The image recognition processor of claim 6, wherein the difference checker comprises:
a plurality of delay setters configured to align an operation result of each of the plurality of nano cores; and
a plurality of margin variable comparators configured to compare the aligned operation results according to a set margin.

12. The image recognition processor of claim 11, wherein margins of each of the plurality of margin variable comparators are adjustable according to an error tolerance level.

13. The image recognition processor of claim 1, further comprising a delay chain configured to sequentially transmit an instruction outputted from the instruction memory to each of rows of the plurality of nano cores according to a delay value of a specific time.

* * * * *